United States Patent [19]

Berreman et al.

[11] Patent Number: 4,529,271
[45] Date of Patent: Jul. 16, 1985

[54] MATRIX ADDRESSED BISTABLE LIQUID CRYSTAL DISPLAY

[75] Inventors: Dwight W. Berreman, New Providence; William R. Heffner, Plainfield; Allan R. Kmetz, Chatham, all of N.J.

[73] Assignee: AT&T Bell Laboratories, Murray Hill, N.J.

[21] Appl. No.: 357,602

[22] Filed: Mar. 12, 1982

[51] Int. Cl.³ .............................................. G02F 1/13
[52] U.S. Cl. ..................... 350/333; 350/341; 350/350 R
[58] Field of Search ........... 350/331 R, 333, 334, 350/341, 349, 350 R

[56] References Cited

U.S. PATENT DOCUMENTS

| | | | |
|---|---|---|---|
| 3,837,730 | 9/1974 | Hatfield et al. | 350/349 |
| 4,011,008 | 3/1977 | Gerritsma et al. | 350/350 R |
| 4,239,345 | 12/1980 | Berreman et al. | 350/350 R X |
| 4,333,708 | 6/1982 | Boyd et al. | 350/334 X |
| 4,400,060 | 8/1983 | Cheng | 350/341 X |

OTHER PUBLICATIONS

Cheng, J. et al., "Switching Characteristics and Threshold Properties of Electrically-Switched Nematic Liquid Crystal Bistable Configuration Devices," 1980 *IEEE Biennial Display Research Conference*, (Oct. 1980), pp. 180-182.

Thurston, R. N. et al., "Mechanically Bistable Liquid-Crystal Display Structures," *IEEE Transactions on Electron Devices*, vol. ED-27, No. 11, (Nov. 1980), pp. 2069-2080.

Primary Examiner—John K. Corbin
Assistant Examiner—Richard F. Gallivan
Attorney, Agent, or Firm—Bernard Tiegerman; Bruce S. Schneider

[57] ABSTRACT

A matrix addressed, bistable liquid crystal optical display is disclosed. The display includes a liquid crystal twist cell which has at least two states which are stable in the presence of a single given holding voltage. A form of 3:1 matrix addressing is used in the display which enhances operational characteristics.

15 Claims, 9 Drawing Figures

GIBBS FREE ENERGY VS SQUARE OF APPLIED VOLTAGE (a) 3:1 SWITCHING (b) 2:1 SWITCHING

MATRIX ADDRESSED BISTABLE LIQUID CRYSTAL DISPLAY

BACKGROUND OF THE INVENTION

1. Field of the Invention

The invention pertains generally to liquid crystal cells and, more particularly, to a matrix addressed liquid crystal optical display.

2. Art Background

Liquid crystals are liquids whose molecules display ordering. This ordering is characterized by a localized alignment of the liquid crystal molecules. The direction of this localized alignment and thus the spatial orientation of the liquid crystal molecules can be changed by the application of electric fields to produce corresponding changes in the optical properties of the liquid crystal. For example, a change in the spatial orientation of a liquid crystal produced by the application of an electric field affects the polarization of light, e.g., visible light in the 4500 to 8000 Angstrom range, incident on the liquid crystal. This change in the polarization of incident visible light can be perceived, for example, by viewing the liquid crystal between a polarizer and analyzer. That is, the change in the polarization of the incident light will result in a change in the amount of the light which is transmitted through the liquid crystal when the liquid crystal is arranged between an appropriately oriented polarizer and analyzer.

A device in which a liquid crystal is confined between two bounding surfaces, at least one of which is transparent to light, is called a liquid crystal cell. Typically, two glass plates are used to confine the liquid crystal. In addition, a plurality of electrodes is usually applied to the glass plates in order to subject discrete portions of the liquid crystal, referred to herein as pixels, to electric fields to thereby alter the spatial configurations, and thus the optical transmission properties, of the pixels. Thus, if some pixels are made to transmit incident light while others do not, an optical effect is produced which can be used to display information.

In one particular type of liquid crystal cell, called a liquid crystal twist cell, the liquid crystal molecules exhibit at least two different spatial configurations when subjected to appropriate electric fields. In at least one of these configurations the molecules assume a twisted, helical configuration, with the axis of the helix oriented perpendicularly with respect to the bounding surfaces. On passing through the liquid crystal twist cell, the plane of polarization of plane polarized incident light is rotated by the helical orientation of the molecules. When the liquid crystal molecules are in the second configuration, the different orientation of the molecules has a different effect on the polarization of the incident light. By, for example, placing the liquid crystal twist cell between crossed polarizers, pixels in one or the other spatial configuration will either transmit incident light through the cell or not transmit light, and thus appear to be light or dark.

Liquid crystal cells have been used in relatively small optical displays, having less than about 100 pixels. These relatively small displays include the now common liquid crystal wristwatches. In many of these relatively small displays the spatial orientation of the liquid crystal of each pixel is regulated by voltage pulses transmitted through an individual electrical lead connected to just that pixel of the display, so that each pixel is individually electrically driven. While the use of individually driven leads is considered acceptable in relatively small optical displays, the cost and complexity of using individually driven leads in a large optical information display, consisting of more than about 100 pixels, is presently prohibitive.

Because of their low power consumption and thin profile, liquid crystal cells have also been used as components for flat panel, large information optical displays, consisting of more than about 100 pixels. The optical transmission states of the many pixels of such large displays are not regulated with individually driven leads. Rather, in order to reduce costs and complexity, the pixels of such large arrays are usually formed as the intersections of an array of row and column electrodes, which intersections define a matrix of liquid crystal pixels. In each liquid crystal pixel the optical transmission is switched from one state to another by applying an appropriate voltage to the pixel through the interaction of voltages applied to the row and column electrodes intersecting at the pixel. Selective switching of individual pixels from one optical transmission state to another in such a matrix array, without appreciably affecting other pixels, is referred to as dynamic matrix addressing.

Dynamically matrix addressed, liquid crystal displays which do not exhibit bistability are limited in size, i.e., are limited in the number of addressable rows or columns. The particular size limit is dependent on the type of scheme used to matrix address the display as well as the properties of the display. A liquid crystal cell which exhibits bistability is one which displays memory with respect to two different spatial orientations of the liquid crystal (which correspond to two different optical transmission states of the cell). That is, the liquid crystal of the cell can be switched to a new spatial orientation by applying, for example, a relatively high voltage across the cell, and the liquid crystal remains in the new orientation even if the voltage is entirely removed or reduced to some lower, nonzero value, i.e., a holding voltage. In addition, in a bistable cell the liquid crystal of the cell is switched to its former orientation by, for example, applying a relatively low voltage (lower than the holding voltage) across the cell and the cell remains in this state even after the relatively low voltage is removed or the voltage is returned to the holding voltage value. The pixels of liquid crystal displays which do not exhibit bistability require continual refreshing by an appropriate voltage signal to maintain an optical contrast. In the case of a nonbistable, liquid crystal matrix display which includes a liquid crystal cell responsive to the root-mean-square (rms) value of an applied AC field (which is the case with liquid crystal twist cells), the upper limit on the number of rows or columns of the matrix display is inversely proportional to the square of the ratio of the rms-voltages required to produce an acceptable optical contrast. Thus, an increase in the number of rows or columns of the display may require a corresponding decrease of this ratio (see A. R. Kmetz, in *Nonemissive Electrooptic Displays*, edited by Kmetz and von Willisen (Plenum, N.Y., 1976), pp. 270–273). Because there are practical limitations on the decreases in the ratios of these rms-voltages which are achievable with liquid crystal displays, it then follows that the number of rows or columns of liquid crystal matrix displays which do not exhibit bistability is limited. However, in principle, no such limit exists for liquid crystal matrix displays which do exhibit bistability of states. Consequently, an important objective of those attempting to perfect large information liquid crystal matrix displays has been to fabricate a liquid crystal matrix display which exhibits bistability.

Efforts directed at developing bistable liquid crystal displays have resulted in the development of temporarily bistable liquid crystal cells (see, e.g., E. P. Raynes, in *Nonemissive Electrooptic Displays,* edited by Kmetz and von Willisen (Plenum, N.Y., 1976), pp. 29–36). A temporarily bistable liquid crystal cell is one which exhibits two states. The cell is switched to one of these states by applying a voltage greater than, or equal to, a threshold voltage across the cell. If the voltage is removed, the cell quickly reverts to the other state, but this reversion can be retarded for a time by applying a biasing voltage lower than the threshold voltage.

Two matrix addressing schemes which have been used with temporarily bistable liquid crystal matrix displays are the "three-to-one" and "two-to-one" matrix addressing schemes. The application of these matrix addressing schemes to temporarily bistable liquid crystal matrix displays has been reviewed by Kmetz in *Nonemissive Electrooptic Displays,* edited by Kmetz and von Willisen (Plenum, N.Y., 1976), pp. 268–269. Both of these addressing schemes employ biasing voltages to retard the relaxation of the liquid crystal from one state to the other. Because these matrix displays are only temporarily bistable and thus require periodic refreshing voltage signals, these displays are limited in their multiplexing capacities (the number of addressable columns or rows). The upper limits on the multiplexing capacities of these displays differ depending on which addressing scheme, e.g., three-to-one or two-to-one, is employed. In general, it cannot be predicted which addressing scheme is preferable for a particular device. For one particular temporarily bistable device reviewed by Kmetz, supra, p. 269, some improvement in writing speed and multiplexing capacity is obtained, at the cost of higher operating voltages and some flicker, by the use of the two-to-one addressing scheme rather than the three-to-one addressing scheme.

A liquid crystal twist cell which is truly bistable, rather than merely temporarily bistable, has been disclosed in U.S. Pat. No. 4,239,345, issued on Dec. 16, 1980, to D. W. Berreman and W. R. Heffner. The cell is characterized by at least two stable states, either of which is stable as long as no external, threshold energy, e.g., no voltage in excess of some threshold voltage, is applied to the cell. External energy is necessary only for switching the cell between the stable states. The potential inherent in this or any other bistable, liquid crystal twist cell, i.e., of using a truly bistable cell to fabricate a large information optical display which, in principle, is not limited in size, has not yet been realized.

SUMMARY OF THE INVENTION

The present invention is a dynamically matrix addressed, bistable liquid crystal optical display. The optical display includes a bistable liquid crystal twist cell of the type described in Proc. SID 22, 191 (1981), and in U.S. patent application Ser. No. 198,294, U.S. Pat. No. 4,505,548, filed Oct. 20, 1980, by D. W. Berreman and W. R. Heffner, which is hereby incorporated by reference. A form of matrix addressing used in the liquid crystal optical display not only allows the display to exploit the advantages inherent in its bistability, but enhances the operational characteristics of the display, when compared with other matrix addressing schemes.

The liquid crystal twist cell included in the optical display of the present invention exhibits two stable states, either of which is maintained by application of a given holding voltage. Switching between the two stable states is effected by application of a switching voltage, which lies outside a holding voltage range over which the cell is bistable, for the short period of time necessary to convert the liquid crystal from one state to another. This switching is effected without passing disclinations (discontinuities in the orientations of the liquid crystal molecules) across the cell. Subsequent to switching, the voltage is returned to a voltage in the holding voltage range and the cell remains stable in the new configuration.

In the optical display of the present invention all pixels of one or more rows or one or more columns are nonselectively and substantially simultaneously "cleared" (the pixels do not transmit light when arranged between crossed polarizers or when other means for producing an optical change is used) by applying, to all pixels in the one or more rows or one or more columns, a voltage below the holding voltage range for a sufficient length of time to switch the pixels to one of the stable states of the liquid crystal. Selected pixels are then "written" (the selected pixels transmit light when arranged between crossed polarizers or when other means for producing an optical change is used) by applying, to the selected pixels, a voltage above the holding voltage range for a sufficient length of time to switch the pixels to the other of the two stable states of the liquid crystal. During the "write" procedure, nonselected pixels are preferably subjected only to the holding voltage. Subsequent to the "write" procedure all pixels are then subjected to the holding voltage.

Among other advantages, the inventive optical display, when matrix addressed with the procedure described above, exhibits a higher operating speed than when matrix addressed with other schemes.

BRIEF DESCRIPTION OF THE DRAWINGS

Embodiments of the matrix addressed, liquid crystal optical display of the present invention are described with reference to the accompanying drawings, where.

DETAILED DESCRIPTION

The present invention is a matrix addressed, bistable, liquid crystal optical information display which includes a plurality of liquid crystal pixels conveniently arranged in a matrix of rows and columns. Because the liquid crystal display is bistable, in principle there is no limit on the size, i.e., on the number of rows or columns, of the display. The content of the information displayed by the liquid crystal display is changed by a form of matrix addressing which enhances the operational characteristics of the display. Thus, for example, this form of matrix addressing enables the content of the information displayed by the present invention to be changed more quickly, and more reliably, than if other forms of addressing were used.

The matrix-like, liquid crystal optical display of the present invention includes a bistable liquid crystal twist cell of the type disclosed in U.S. patent application Ser. No. 198,294, U.S. Pat. No. 4,505,548, filed Oct. 20, 1980, by D. W. Berreman and W. R. Heffner, which cell, as used in the inventive display, includes a relatively large number of pixels, typically in excess of about 100. Although the bistable liquid crystal twist cell is fully described in U.S. patent application Ser. No. 198,294, for the sake of completeness and continuity the cell is briefly described below.

Figure 1:
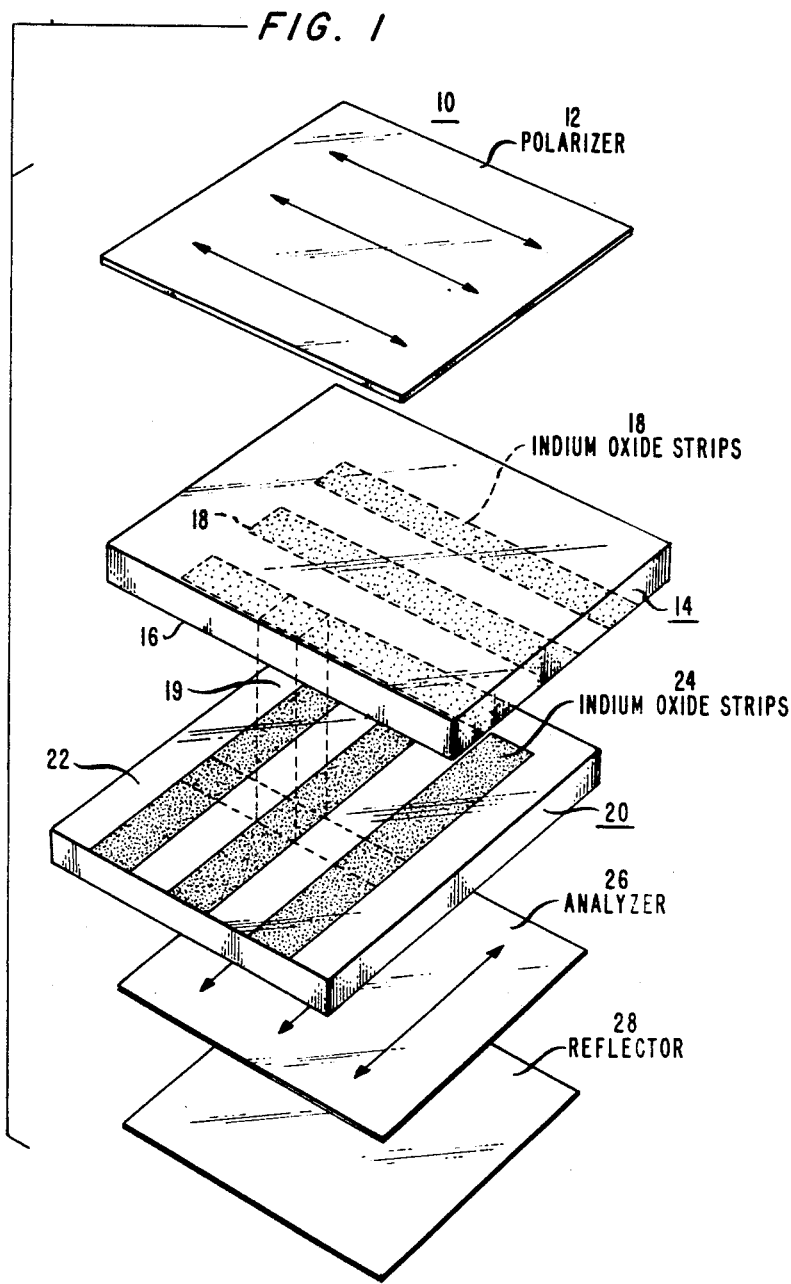
FIG. 1 is an exploded, perspective view of one embodiment of the bistable liquid crystal twist cell useful in the inventive optical display.

With reference to FIG. 1, one embodiment of the bistable liquid crystal twist cell 10 useful in the optical display of the present invention includes two bounding surfaces 16 and 22. These bounding surfaces 16 and 22 serve to confine the liquid crystal material of the cell 10 between them and define the upper and lower boundaries of the liquid crystal material. Typically, the distance between these surfaces, defined as the thickness of the liquid crystal cell, ranges from about 1 micron to about 100 microns, and preferably from about 5 microns to about 20 microns. At least one of the bounding surfaces, surface 16, transmits electromagnetic radiation of interest. Thus, for example, if the optical display of the present invention is to display information to humans, then surface 16 transmits incident visible light in the 4500 to 8000 Angstrom range. On the other hand, if the inventive optical display is used to communicate with machines, such as computers, then surface 16 transmits the incident electromagnetic radiation used for this purpose, e.g., infrared radiation at wavelengths greater than about 8000 Angstroms. Two convenient bounding surfaces 16 and 22 for transmitting visible light are the lower and upper surfaces, respectively, of two glass plates 14 and 20.

The liquid crystal twist cell 10 also includes electrodes which define the liquid crystal pixels included in the optical information display of the present invention. In one embodiment the electrodes consist of one or more electrically conductive strips 18 and 24 of, for example, indium oxide evaporated onto each of the bounding surfaces 16 and 22. The electrodes 18 on the upper bounding surface 16 are pictured in FIG. 1 as being parallel to one another, although they need not be so provided they do not electrically contact one another, and the electrodes 24 on the lower bounding surface 22 are also pictured as being parallel to one another, although they need not be so provided they do not electrically contact one another. In addition, the electrodes 18 and 24 need not be straight, as pictured in FIG. 1, but can have curved shapes, e.g., shapes characteristic of alphanumeric characters. Moreover, the width of the electrodes 18 and 24 need not be uniform. However, the electrodes 18 and 24 are arranged transversely (not parallel) with respect to each other. By projecting the electrodes 18 down onto the electrodes 24, discrete portions or columns 19 of liquid crystal are defined, which columns constitute the pixels of the optical display of the present invention. Thus, for example, if the electrodes 18 and 24 are straight, then each pair of transversely oriented electrodes defines one pixel. If a liquid crystal twist cell 10 has n straight electrodes oriented transversely with respect to m straight electrodes, it thus has n×m pixels.

In principle, there is no upper limit on the width of the indium oxide strips 18 and 24. However, the width of these strips is preferably no smaller than about 0.001 inches. At widths smaller than about 0.001 inches, the lateral dimensions of the pixels (defined by the projections of indium oxide strips onto transversely oriented oxide strips) become comparable to their height (the distance between the bounding surfaces 16 and 22). This results in a degradation of the preferred manner of operation of the liquid crystal twist cell, described below.

The liquid crystal twist cell 10 useful in the optical display of the present invention is distinguished from most other liquid crystal cells by having two stable states, either of which may be maintained by the same holding voltage. These stable states have different spatial molecular orientations. In addition, the liquid crystal twist cell is switched from one stable state to the other without passing a disclination (a line of discontinuity in the orientation of the liquid crystal molecules) through the cell.

The optical transmission properties of the two stable states of the liquid crystal twist cell 10 differ. That is, each state affects the polarization of incident, plane polarized light differently. The liquid crystal twist cell 10 includes apparatus for optically distinguishing between the two states. This apparatus takes the convenient form of a polarizer 12, a crossed analyzer 26, and a reflector 28, as shown in FIG. 1.

The bistability of the liquid crystal twist cell 10 is between two more or less helically twisted states. This bistability is achieved by satisfying two conditions. The first condition which should be satisfied is that the liquid crystal have an unstrained pitch approxmately equal to the thickness of the liquid crystal layer. The term "pitch" denotes the distance in which the liquid crystal directors rotate through a full helical turn. The liquid crystal directors are oriented lines used to indicate the orientation of the liquid crystal molecules (see, e.g., P. G. DeGennes, *Physics of Liquid Crystals* (Clarendon Press, Oxford 1975), p. 7, for a more complete explanation of the concept of liquid crystal directors). The term "unstrained" in the phrase "unstrained pitch" denotes the fact that the liquid crystal assumes a helically twisted configuration without the application of a torque. Hereinafter, the term "pitch" is used to denote "unstrained pitch." Thus, to satisfy the first condition, the ratio of the thickness of the liquid crystal layer, t, to the pitch, P, of the liquid crystal should be approximately equal to one. The range of the thickness-to-pitch ratio, t/P, over which the liquid crystal twist cell remains bistable is dependent on the material properties of the liquid crystal, the total rotation of the liquid crystal directors, as well as the inclination of the liquid crystal directors at the bounding surfaces, as discussed below. By way of example, and for typical liquid crystal materials, the cell is bistable if t/P is in the range from about 0.8 to about 1.2. A thickness-to-pitch ratio of about one is achieved by, for example, adding an appropriate amount of chiral dopant (a dopant which induces helical twist in the liquid crystal), such as cholesteryl nonanoate, CN, to a nematic liquid crystal such as the cyanobiphenyl-terphenyl mixture sold under the trade name E-7 and which can be purchased from the British Drug House. It has been found that the relation between pitch, P, in microns, and concentration of CN,C, in E-7, in percent by weight of CN, is given by the formula $$PC = 18.8 \mu \%,$$

which enables one to determine the appropriate concentration of CN in E-7 necessary to achieve a desired pitch.

Liquid crystal materials are characterized by a number of parameters, including the elastic constants $K_1$, $K_2$ and $K_3$ (see, e.g., P. G. DeGennes, supra, p. 63). The liquid crystal materials useful in the liquid crystal twist cell 10 are those where $K_1$ is approximately equal to $K_3$ and $K_2$ is approximately one-half $K_1$ or $K_3$. Thus, other nematic liquid crystals, besides E-7, whose elastic constants satisfy this relationship and which are useful with the liquid crystal twist cell 10 include the nematic liquid crystal sold under the trade name ROTN 619, and which can be purchased from Hoffmann-La Roche, Inc. of Nutley, N.J. Chiral dopants which are added to ROTN 619 to produce a t/P of about one include the chiral dopant sold under the trade name CB-15, and which can be purchased from EM Laboratories, Inc. of Elmsford, N.Y.

The second condition which should be satisfied to achieve bistability is that the liquid crystal directors at one or both of the bounding surfaces 16 and 22 be obliquely inclined relative to the bounding surfaces. Preferably, the inclination of the liquid crystal directors at one or both of the bounding surfaces 16 and 22, relative to these surfaces, is in the range of about 20 degrees to about 50 degrees. This inclination is achieved, for example, by evaporating silicon-monoxide onto the bounding surfaces 16 and 22 at an angle of about 5 degrees relative to these surfaces. The silicon monoxide induces an oblique inclination of the liquid crystal directors at the bounding surfaces. Satisfying the two conditions described above, with the liquid crystal directors obliquely inclined at both bounding surfaces, produces a torque on the liquid crystal, the axis of which torque is generally aligned with the helical twist axis of the liquid crystal and thus perpendicular to the bounding surfaces. This is in contrast to other liquid crystal twist cells, such as the liquid crystal twist cell described by W. Greubel in *Appl. Phys. Lett.* 25, 5 (1974), where the liquid crystal directors at the bounding surfaces are not obliquely inclined to, but rather perpendicular to, the bounding surfaces and the liquid crystal is not subject to a torque.

As noted above, one of the two conditions which should be satisfied for bistability is that t/P be about one. For E-7 doped with CN, for an inclination of the liquid crystal directors at the bounding surfaces of about 33 degrees, and for a rotation of the liquid crystal directors about the helical twist axis of about 360 degrees, t/P ranges from about 0.8 to about 1.2 (the range of t/P is dependent on the inclination of the directors at the bonding surfaces). Values of t/P greater than about 1.2 are undesirable because the liquid crystal twist cell ceases to be bistable. Values of t/P less than about 0.8 are undesirable because the time required to switch from one of the two stable states to the other becomes undesirably long. For a particular liquid crystal material, an appropriate t/P is easily determined by employing a control sample.

Figure 2:
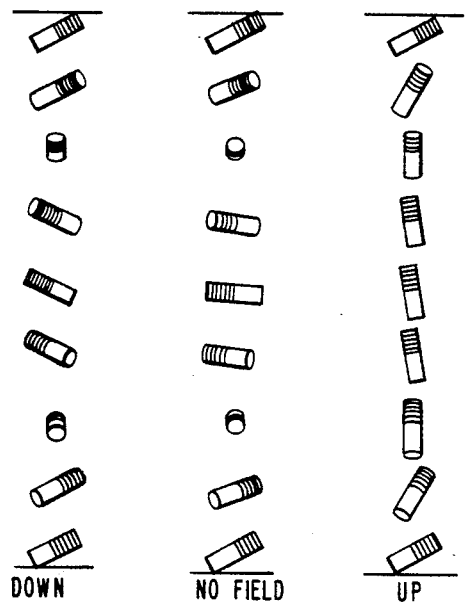
FIG. 2 is a schematic representation of the liquid crystal directors when the bistable liquid crystal twist cell useful in the inventive optical display is in three different states denoted, respectively, the DOWN state, the NO FIELD state, and the UP state.

The two stable, helically twisted states of the liquid crystal twist cell 10, referred to here as the DOWN state and the UP state, are shown in FIG. 2. In the DOWN state, the liquid crystal directors rotate approximately a full turn through the liquid crystal layer while the inclination angle of the directors relative to the bounding surfaces 16 and 22 remains constant. The amount of the rotation ranges from about 265 degrees to about 400 degrees, and preferably from about 355 to about 365 degrees. The DOWN state is similar to the configuration when no field is applied. The UP state differs from the DOWN state in that in the middle of the liquid crystal layer, the liquid crystal directors are nearly perpendicular to the bounding surfaces 16 and 22.

When a pixel 19 of the liquid crystal twist cell 10 is in the DOWN state, the plane of polarization of incident light is rotated through approximately a full turn, i.e., through about 360 degrees, and consequently the pixel appears dark or "off" between the crossed polarizer 12 and analyzer 26. When the pixel 19 is in the UP state, the incident light becomes elliptically polarized during its passage through the pixel, and a portion of this elliptically polarized light exits the pixel polarized perpendicularly with respect to the incident direction and therefore parallel to the analyzer 26. This component, parallel to the analyzer 26, contains as much, or even more, than half of the light energy transmitted through the liquid crystal cell. Therefore, a pixel 19 in the UP state transmits at least a portion of the incident light through the cell and thus appears to be "on".

In other embodiments of the liquid crystal twist cell 10 the DOWN state rather than the UP transmits light through the cell. In these embodiments the DOWN state transmits light because, for example, a quarter wave plate is placed between the lower glass plate 20 and the analyzer 26. The quarter wave plate converts elliptically polarized light, such as that produced by the UP state, to plane polarized light. By appropriately tuning the quarter wave plate and appropriately orienting the analyzer 26 relative to the quarter wave plate, the DOWN state transmits incident light and the UP state does not.

In one embodiment of the liquid crystal twist cell 10, the liquid crystal is responsive to AC electric fields of frequency about 20 to about 200,000 Hz and preferably of frequency about 40 to about 600 Hz. In fact, the spatial state of the liquid crystal is a function of the rms-value of the applied AC voltage at any chosen frequency in the above range. However, the liquid crystal is insensitive to voltage polarities at these frequencies.

Figure 3:
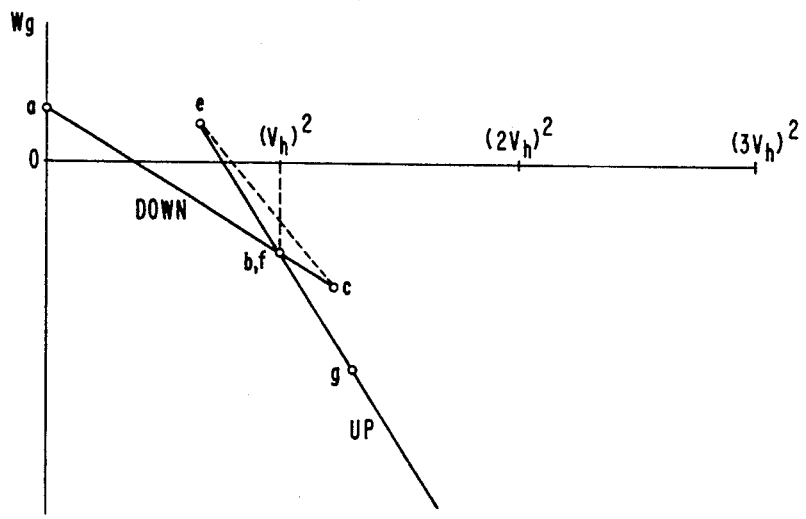
FIG. 3 is an energy diagram depicting the Gibbs free energy versus the square of the applied voltage for the DOWN and UP states of the bistable liquid crystal twist cell useful in the inventive optical display.

The operation of the liquid crystal twist cell 10 is conveniently described with reference to FIG. 3, which is a graph depicting, qualitatively, the Gibbs free energy of the liquid crystal as a function of the square of the rms-voltage (called the mean square voltage) applied across the cell. For the sake of simplicity, the term voltage is used in this disclosure to denote an rms-voltage. In FIG. 3, the line joining points a and c represents the energy curve for the DOWN state, while the line joining points e and g represents the energy curve for the UP state. The curve ec represents an intermediate barrier state between the UP and DOWN states. Moreover, the voltage range between the voltages associated with the points e and c represents a range of holding voltages over which the liquid crystal twist cell 10 is bistable.

For voltages less than the voltage associated with the point e, only the DOWN state exists. As the voltage is increased to some value between the voltages associated with the points e and c, i.e., to some value in the holding voltage range such as $V_h$, the cell still remains in the DOWN state. However, once the voltage is increased beyond that associated with the point c, i.e., once the voltage exceeds the holding voltage range, the cell switches to the UP state. After the cell has switched to the UP state, the voltage may be returned to any value in the bistable range, e.g., to $V_h$, and the cell will remain in the UP state. Lowering the voltage below that associated with the point e results in the cell switching from the UP state to the DOWN state. Returning the voltage to the bistable region, e.g., to $V_h$, leaves the cell in the DOWN state. Operation of the cell thus involves application of a holding voltage chosen from the holding voltage range to a pixel 19 of the liquid crystal twist cell 10, and the application of a voltage outside the holding voltage range to the pixel only when switching is desired. That is, switching is accomplished by raising or lowering the voltage to values outside the holding voltage range for a sufficient duration of time. The minimum duration of time needed to achieve switching is called the switching time.

In the above description of the operation of the liquid crystal twist cell 10, it was assumed that the point e lies to the right of the vertical axis, i.e., the energy axis, in FIG. 3. But in some particular cells point e does, in fact, lie to the left of the vertical energy axis. In this situation, switching from the UP to the DOWN state is not accomplished just by decreasing the voltage to a value below that associated with the point e. However, switching from the UP to the DOWN state is accomplished by employing fluid dynamic effects (see columns 4–5 of U.S. Pat. No. 4,239,345, which is hereby incorporated by reference), or dielectric anisotropy reversal with AC fields of frequency greater than about 10 kHz (see Gerritsma et al, *Solid State Comm.* 17, 1077 (1975)).

In principle, the liquid crystal twist cell 10 useful in the present invention is indefinitely bistable. That is, in principle, there exits a holding voltage range over which either the UP state or the DOWN is stable indefinitely. Obviously, this is not verifiable in practice. However, a holding voltage is capable of maintaining either state for at least 5 minutes, and in fact significantly longer than 5 minutes.

The liquid crystal optical display of the present invention includes a version of the liquid crystal twist cell 10, described above, with a relatively large number of transversely oriented electrodes 18 and 24, e.g., the transversely oriented indium oxide strips, on bounding surfaces 16 and 22 defining a relatively large matrix of pixels. For example, the liquid crystal optical display includes 4 or more rows of indium oxide strips intersecting 4 or more columns of indium oxide strips, thereby defining an array of pixels, arranged in rows and columns, numbering 16 or more. Preferably, the liquid crystal optical display includes 10 or more rows of indium oxide strips intersecting 10 or more columns of indium oxide strips, defining 100 or more pixels. By applying appropriate voltage pulses in an appropriate sequence to the row and column indium oxide electrodes, that is, by dynamically matrix addressing the optical display, information is displayed.

The dynamic matrix addressing procedure used in the present invention is such that the information displayed by the inventive optical display is changed in two steps. First, a voltage pulse whose amplitude is smaller than the holding voltage, e.g., zero voltage, and of duration equal to the switching time, is nonselectively applied to all pixels of a row or of all rows (or of a column or of all columns) through the row and column electrodes, in order to cause these pixels to switch from the UP state (if they are in this state) to the DOWN state. That is, all the pixels of one or more rows (or one or more columns) are nonselectively, substantially simultaneously switched from the UP state to the DOWN state. The term "substantially simultaneously" is used to denote the fact that the voltage pulse used to switch the pixels from the UP state to the DOWN state may not be received by all the pixels of the one or more rows (or one or more columns) at exactly the same instant of time. Thus the pixels may not switch at exactly the same instant. However, it is only necessary that this voltage pulse reach all the pixels over a relatively short period of time, e.g., a time comparable to the period of the applied AC voltage, for the inventive display to operate in a desirable fashion. In the DOWN state the pixels transmit no light and thus appear dark or "off." The switching of a pixel from the UP state to the DOWN state is referred to in this disclosure as a CLEAR (U→D) transition. The second step involves the selective application of a voltage pulse of amplitude greater than the holding voltage and of duration equal to or greater than the switching time to particular pixels, through the row and column electrodes, in order to cause these particular pixels to switch from the DOWN state (if they are in this state) to the UP state. In the UP state the pixels transmit light and thus appear to be "on." The switching of a pixel from the DOWN state to the UP state is referred to this disclosure as a WRITE (D→U) transition.

Figure 4:
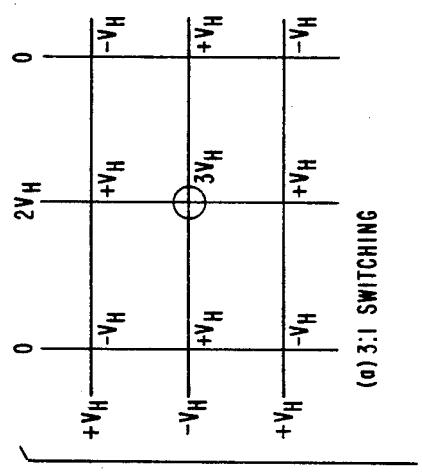
FIG. 4 illustrates three-to-one and two-to-one matrix addressing.
Figure 4:
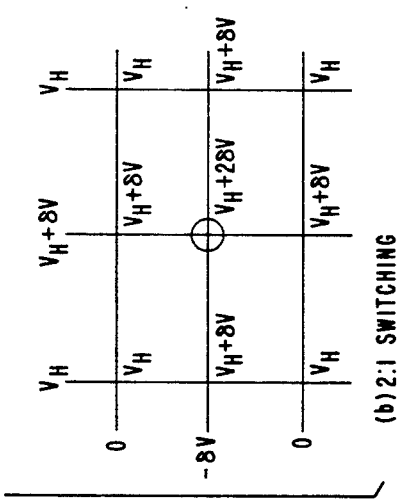

By way of example, FIG. 4(a) illustrates the matrix addressing procedure used in a preferred embodiment of the present invention. This preferred embodiment employs three-to-one addressing, an addressing scheme wherein all pixels of one or more rows or one or more columns are nonselectively, substantially simultaneously CLEARED, and then pixels are selectively WRITTEN. Three-to-one matrix addressing is conveniently described with reference to the terms "selected pixel," "selected row," and "selected column." A "selected pixel" is one which has been selected to undergo a WRITE transition, and is thus a pixel which has been selected to transmit light (when viewed between the crossed polarizer 12 and analyzer 26). The circled pixel in FIG. 4(a) is "selected pixel." "Selected rows" and "selected columns" are those containing "selected pixels." Thus, a "selected pixel" is one at the intersection of a "selected row" and "selected column."

In the preferred embodiment, as in all embodiments of the present invention, all the pixels of one or more rows (and/or of one or more columns) of the optical display are initially nonselectively, substantially simultaneously CLEARED. This is accomplished, for example, by applying a voltage pulse, of duration equal to or greater than the switching time, to the row electrode containing the row of pixels to be cleared, and an identical voltage pulse to all the column electrodes. A pixel is, by definition, just the column of liquid crystal defined by the projection of one electrode on the bounding surface 16 onto a transversely oriented electrode on the bounding surface 22. Thus, when voltages are applied to the transversely oriented electrodes which define a pixel, the pixel "sees" only the difference in the voltages applied to the electrodes. Consequently, each pixel in the row of pixels to be CLEARED experiences a zero voltage pulse (zero voltage being below the holding voltage range and therefore leading to a CLEAR transition) because each pixel in the row "sees" a voltage equal to the difference between the identical column and row voltages.

After one or more rows (or one or more columns) of pixels of the preferred embodiment of the optical display are nonselectively, substantially simultaneously CLEARED, the preferred embodiment is then WRITTEN. That is, selected pixels are caused to undergo a WRITE transition. A selected pixel is caused to undergo a WRITE transition by applying to the selected column electrode a voltage pulse of amplitude $2 V_H$ and of duration equal to or greater than the switching time, while the other nonselected column electrodes are maintained at zero voltage. Here, $V_H$ denotes the holding voltage applied to the pixels of the preferred embodiment, which voltage may take on any value in the holding voltage range (see FIG. 3). For purposes of illustration, the voltage $V_H$ is assumed to be equal to the voltage midway between the voltages at the ends of the holding voltage range. Simultaneously with the application of the $2 V_H$ and zero voltages to the selected and nonselected column electrodes, the selected row electrodes receive a voltage pulse of amplitude $-V_H$ of duration equal to the switching time while the nonselected row electrodes are held at $V_H$. The selected pixels, i.e., the pixels at the intersections of the selected column and row electrodes, thus experience a voltage pulse of amplitude $3 V_H$ (the difference between the selected column and row voltages) while the nonselected elements are all maintained at the holding voltage (that is, at $+V_H$ or $-V_H$, the pixels being unaffected by the voltage polarities). Of course, the voltages applied to the row electrodes and column electrodes are interchangeable.

There are two variations of the preferred embodiment of the inventive optical display which employ different WRITE procedures. In the first variation row-by-row scanning is employed. That is, each row electrode is sequentially subjected to a voltage pulse of amplitude $-V_H$ while all other row electrodes are subjected to a voltage pulse of amplitude $+V_H$. Simultaneously, as a scanned row electrode is subjected to the voltage pulse of amplitude $-V_H$, column electrodes containing selected pixels in the row are subjected to a voltage pulse of amplitude $2 V_H$ while all other column electrodes are subjected to zero voltage. In the second variation, column-by-column scanning is employed. That is, each column electrode is sequentially subjected to a voltage pulse of amplitude $2 V_H$ while all other column electrodes are subjected to a zero voltage pulse. Simultaneously, row electrodes containing selected pixels which fall within the scanned column electrode are subjected to a voltage pulse of amplitude $-V_H$ while all other row electrodes are subjected to a voltage $+V_H$.

In order to matrix address the inventive optical display, as described above, certain operational characteristics of the optical display should be determined. Among these are the bistable holding voltage range of the display, as well as the voltage pulse durations necessary to produce CLEAR (U→D) and WRITE (D→U) transitions, once the voltage pulse amplitudes have been chosen. Thus, for example, if CLEAR transitions are to be produced with a zero voltage pulse, the switching time at zero volts should be known. Similarly, if WRITE transitions are to be produced with a voltage pulse of amplitude, for example, three times the holding voltage, the switching time at three times the holding voltage should be known.

Variations in the thickness-to-pitch ratio, t/P, of the liquid crystal twist cell included in the inventive optical display (small thickness variations are almost unavoidable) significantly affect both the extent of the holding voltage range and the switching times of the inventive optical display. An acceptable extent of a holding voltage range is one which is one half percent or more of the mean value of the range. If the extent of the holding voltage range is smaller than this, the holding voltage range is said to be pinched off. Thus, for example, if the liquid crystal is E-7 doped with CN, then as t/P is increased above 1.0 (t/P should be approximately equal to 1.0 for bistability), it is known that the holding voltage range narrows and is pinched off at t/P approximately equal to 1.15. Thus, for E-7 doped with CN, t/P is limited to values below 1.15, and preferably below about 1.10. In addition, it is known that switching times for CLEAR transitions increase sharply for values of t/P below about 0.95. Thus, if the liquid crystal is E-7 doped with CN, the variation of the thickness-to-pitch ratio of the liquid crystal twist cell included in the present invention is preferably from about 0.95 to about 1.10. Within this thickness-to-pitch range, switching times for the inventive optical display for both WRITE and CLEAR transitions are chosen, as described below, to be of sufficient duration to ensure that all pixels undergo switching.

Figure 5:
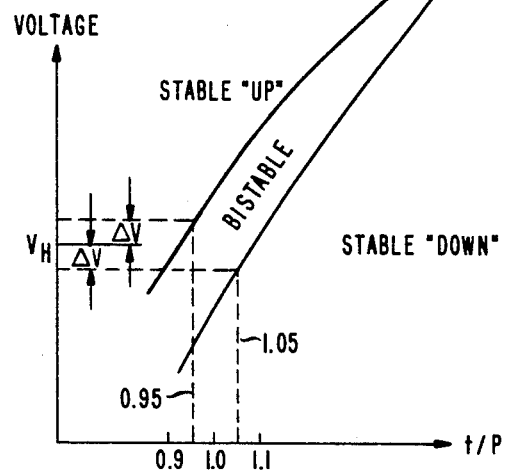
FIG. 5 is a graph of voltage versus thickness-to-pitch ratio depicting one procedure for measuring the practical bistable voltage range of the inventive optical display.

A "practical" holding voltage range is one over which the inventive optical display is bistable for at least some minimum length of time, e.g., 5 minutes. One procedure for determining the "practical" bistable voltage range and the switching times for the optical display of the present invention is to determine these parameters for a control sample, i.e., a sample liquid crystal twist cell useful in the optical display. The control sample, as well as the inventive optical display, will almost always exhibit some variation in t/P as well as other imperfections. Thus, the practical bistable voltage range of the inventive optical display is determined by measuring and plotting, for the control sample, both the maximum voltage at which the DOWN state is stable and the minimum voltage at which the UP state is stable as a function of the t/P of the control sample, as shown in FIG. 5. If the thickness-to-pitch ratio of the control sample varies, for example, for 0.95 to 1.05, then the upper bound on the practical bistable voltage range is just the voltage intercept associated with the intersection of the line t/P=0.95 with the curve describing the maximum voltage at which the DOWN state is stable (the upper curve in FIG. 5). The lower bound on the useful bistable voltage range is just the voltage intercept associated with the intersection of the line t/P=1.05 with the curve describing the minimum voltage at which the UP state is stable (the lower curve in FIG. 5). Having determined the upper and lower bounds of the practical bistable voltage range, this voltage range is conveniently defined in terms of some mean value, $V_H$, and some increment, $\Delta V$, as shown in FIG. 5. Thus, the practical bistable voltage range is specifed as $V_H \pm \Delta V$.

Figure 6:
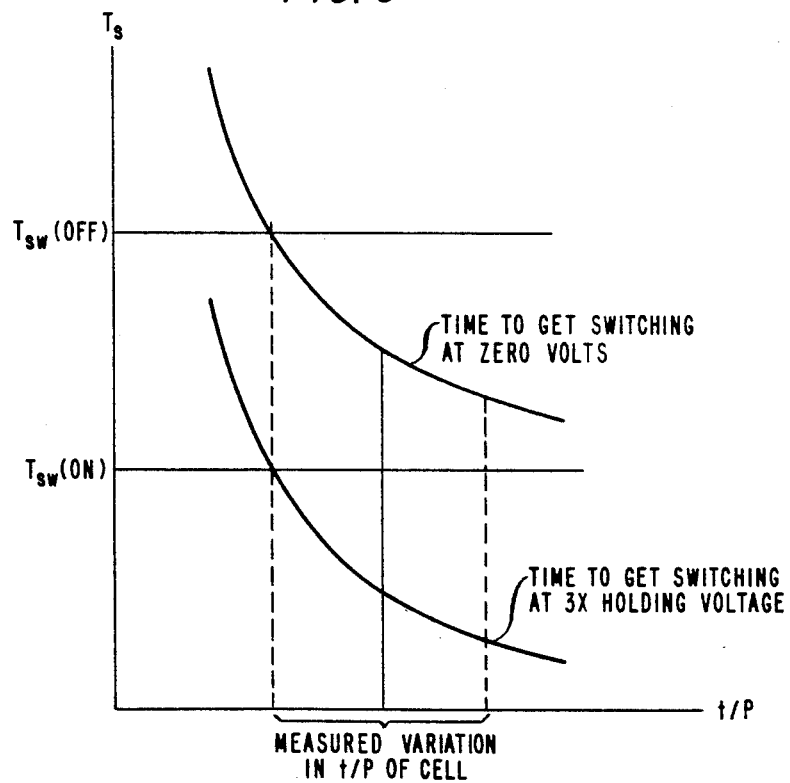
FIG. 6 is a graph of switching time versus thickness-to-pitch ratio depicting one procedure for measuring $T_{SW}(on)$ and $T_{SW}(off)$ for the inventive optical display.

Having determined the practical bistable voltage range, the optical display is matrix addressed once appropriate switching times for "on" and "off" switching, i.e., WRITE and CLEAR transitions, are known. For example, if a zero voltage pulse is to be used to produce a CLEAR transition and a voltage pulse of amplitude three times the holding voltage is to be used to produce a WRITE transition, then switching times at zero volts and at three times the holding voltage (as determined above) should be determined. This is done by measuring, and plotting, for the control sample, the switching time, $T_S$, at zero volts and at three times the holding voltage as a function of the measured t/P of the control sample, as shown in FIG. 6. From this curve a switching time is chosen, $T_{SW}(on)$, sufficient to turn "on" the whole of the control sample when it is subjected to three times the holding voltage (as shown in FIG. 6). Similarly, another switching time is chosen, $T_{SW}(off)$, sufficient to turn "off" the whole of the control sample when it is subjected to zero volts (as shown in FIG. 6). These values of $T_{SW}(on)$ and $T_{SW}(off)$ are applicable to the optical display. Of course, switching times greater than $T_{SW}(on)$ and $T_{SW}(off)$ are also useful.

Once the practical bistable voltage range, as well as $T_{SW}(on)$ and $T_{SW}(off)$, of the optical display have been determined, as described above, then a two-step matrix addressing scheme wherein the pixels of a row or of all rows (and/or of a column or all columns) are first nonselectively, simultaneously CLEARED and then selectively WRITTEN is readily applied to the inventive optical display.

It has been found, empirically, but readily, that for the preferred embodiment of the present invention the voltages applied to the selected columns, selected rows, and nonselected rows need not be exactly equal to, respectively, $2V_H$, $-V_H$, and $+V_H$. Here $V_H$ denotes the mean value of the practical bistable voltage range of the optical display. Rather, there is a permissible variation in these voltages related to the increment $\Delta V$ used in specifying the practical bistable voltage range. If the selected column voltage is defined to be $(2+\Delta x)V_H$, the nonselected row voltage is defined to be $(1+\Delta y)V_H$, and the selected row voltage is defined to be $-(1+\Delta z)V_H$, where $\Delta x$, $\Delta y$, and $\Delta z$ are positive or negative increments, then these increments take on the following useful values if row-by-row scanning is employed:

(1) $|\Delta y| \leq \Delta V/V_H$;
(2) $|\Delta x - \Delta y| \leq \Delta V/V_H$; and
(3) $V_H(1+\Delta z)$ should be such that any pixel of the inventive optical display remains stable during $T_{SW}(on)$. This conditions is satisfied if $|\Delta z\Delta|$ is taken to be, for example, $|\Delta z| \leq \Delta V/V_H$.

If column-by-column scanning is employed, then the increments $\Delta x$, $\Delta y$, and $\Delta z$ take on the following useful values:

(1) $|\Delta y| \leq \Delta V/V_H$;
(2) $|\Delta z| \leq \Delta V/V_H$; and
(3) $V_H(1+\Delta x-\Delta y)$ should be such that any pixel of the inventive optical display remains stable during $T_{SW}(on)$. This condition is satisfied if $|\Delta x-\Delta y|$ is taken to be, for example, $|\Delta x-\Delta y| \leq \Delta V/V_H$.

EXAMPLE 1

One embodiment of the matrix addressed, bistable, liquid crystal optical display of the present invention was fabricated as described below. This display was fabricated to include an array of 16 pixels defined by the intersections of 4 row electrodes and 4 column electrodes.

The bistable liquid crystal twist cell included in the preferred embodiment of the inventive optical display was fabricated using two indium oxide-coated, rectangular glass plates purchased from the Practical Products Company of Cincinnati, Ohio. The indium oxide coating on each glass plate was transparent, and each glass plate had dimensions of $1'' \times 1\frac{1}{2}'' \times \frac{5}{8}''$. Selected portions of the indium oxide coating on each glass plate were photolithographically removed, leaving four parallel strips of indium oxide on each glass plate, each strip having a width of about 1 mm. The surface of each glass plate bearing the indium oxide strips was then overcoated with a layer of silicon monoxide about 100 Angstroms thick by evaporating the silicon monoxide onto each glass plate at a grazing angle of about 5 degrees relative to the surface of each glass plate.

The two glass plates were oriented with respect to one another and separated with two 13 μm-thick mylar spacers placed along opposite edges of the glass plates. In orienting the glass plates, the surfaces bearing the indium oxide strips faced each other and the strips on one surface were perpendicular to the strips on the other surface. In addition, the glass plates were oriented so that the directions from which the silicon monoxide had been evaporated onto the surfaces of the glass plates differed by 180 degrees. Furthermore, one glass plate was longitudinally offset from the other by about ¼ inch.

The two glass plates were epoxied together along the two edges separated by the mylar spacers, leaving two open edges (the offset edges) for liquid crystal filling and electrode connections. Each of the glass plates included an overchanging portion extending from the liquid crystal twist cell (see FIG. 1). The sandwich of glass plates was then cured at a temperature of about 100° C. for about one hour to stabilize the cell thickness. Thereafter, the thickness of the cell was measured by counting interference fringes of monochromatic light using a variable wavelength monochrometer as the light source. Cell thickness variation was recorded by photographing the interference fringes under sodium illumination. The cell thickness and thickness variation were measured to be 16.2 μm±1.5%.

By applying a drop of a liquid crystal mixture to one of the open sides of the cell, the space between the glass plates was filled with the liquid crystal mixture by capillary action. The liquid crystal mixture used included the cyanobiphenyl-terphenyl mixture sold under the trade name E-7, which was purchased from EM Laboratories, Inc. of Elmsford, N.Y. The E-7 was doped with 1.303 percent by weight of cholesteryl nonanoate to produce a thickness-to-pitch ratio (based upon the above measured cell thickness and cell thickness variation) of 1.126±1.5%.

The inclination of the liquid crystal directors at the silicon monoxide coated surfaces for undoped E-7 was measured by conoscopy (see Crossland et al, *J. Phys. D: Appl. Phys.* 9, 2001 (1976)) in a separate cell with no helical twist. An inclination of about 33 degrees relative to the coated surfaces was measured. It was assumed that the inclination of the liquid crystal directors in the cell with twist, the cell used in the optical display, was also 33 degrees.

Electrical contacts were made between the cell and external wires through two Zebra strips (conductive, elastomeric strips). That is, two Zebra strips were applied to the overhanging surfaces of the glass plates bearing the indium oxide electrodes and extending from the cell. Each Zebra strip was applied to one of the glass surfaces bearing the indium oxide electrodes, and arranged transversely with respect to the electrodes. Four external wires were mounted on each Zebra strip, each of the wires communicating with just one of the indium oxide strips through the Zebra strip (by virtue of the unidirectional conductive properties of the Zebra strip). Electrical signals are communicated to each of the indium oxide electrodes through the external wires.

In order to determine the practical holding voltage range and the switching times of the liquid crystal twist cell, first the amplitude and then the duration of a 500 Hz voltage signal applied to the pixels of the cell was varied while the optical transmission states of all 16 pixels, as viewed between crossed polarizers, were observed through a microscope. It was found that the practical holding voltage range for the liquid crystal twist cell of the optical display, at a room temperature of about 26.5° C., was 1.67–1.69 volts. The term "practical" means that, over the voltage range of 1.67–1.69 volts, the cell exhibited bistability for at least 5 minutes. The holding voltage used in matrix addressing the optical display was 1.68 volts. It was also found that the switching times for the cell, i.e., $T_{SW}(on)$ and $T_{SW}(off)$, were, respectively, about 18 msec and about 130 msec. Here, $T_{SW}(on)$ denotes the minimum pulse duration required to produce a WRITE transition at all 16 pixels at a voltage equal to three times the holding voltage (of 1.68 volts), while $T_{SW}(off)$ denotes the minimum pulse duration required to produce a CLEAR transition at all 16 pixels at zero volts.

All the pixels of the preferred embodiment were first CLEARED and then a pattern of selected pixels was WRITTEN. If the notation (i,j) is used to denote the row and column locations of a selected pixel, then the selected pixels were at (1,2), (1,3), (2,1), (2,4), (3,1), (3,4), (4,2), and (4,4). The time required to WRITE the pattern of selected pixels, using row-by-row scanning, was 72 msec (= $T_{SW}(on) \times 4$ rows = 18 × 4).

EXAMPLE 2

The content of the information displayed by the optical display of the present invention is changed by a two-step matrix addressing procedure wherein all pixels of one or more or even all rows (and/or of one or more or even all columns) are first nonselectively, simultaneously CLEARED and then particular pixels are selectively WRITTEN. This addressing procedure enables the content of the information displayed by the present invention to be changed much more quickly than if the pixels were first selectively CLEARED and then selectively WRITTEN. This can be deduced from FIG. 7 which depicts the typical dependence of the switching time on the switching voltage, $V_S$, for both CLEAR and WRITE transitions, of the bistable liquid crystal twist cell useful in the present invention, at room temperature (23.5° C.).

Figure 7:
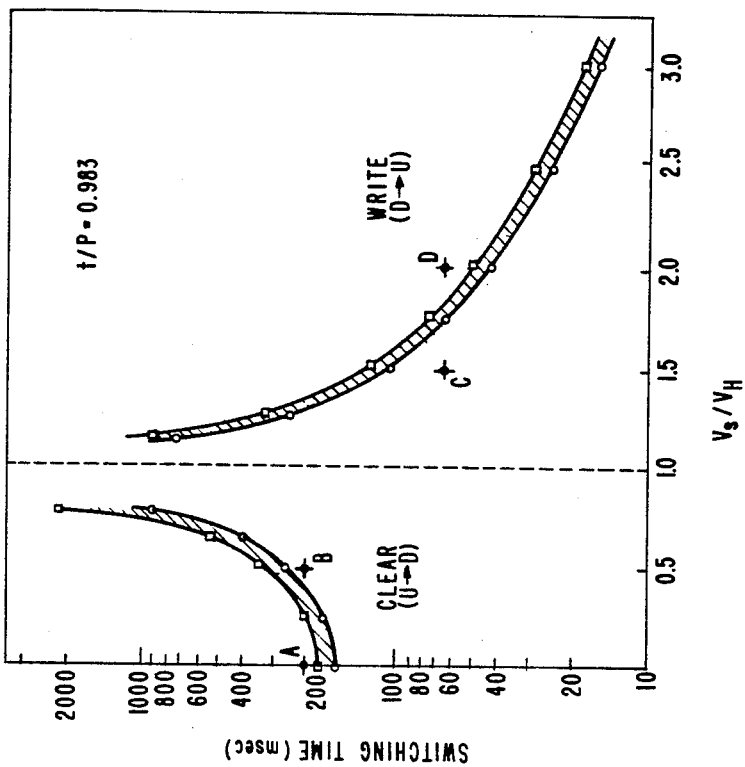
FIG. 7 is a graph of the switching time versus the ratio of switching voltage to holding voltage, for the CLEAR (U→D) and WRITE (D→U) transitions of the bistable liquid crystal twist cell useful in the inventive optical display.

The curves of FIG. 7 represent the switching characteristics of a relatively uniform portion of a liquid crystal twist cell which was fabricated in accordance with the procedure described in Example 1. The liquid crystal was E-7 doped with CN. The relatively uniform portion of the cell included three adjacent pixels which had a thickness of about 15 microns with a thickness variation of ±0.2%, and a t/P of about 0.983 and a corresponding t/P variation of ±0.2%. The practical holding voltage range for the three adjacent pixels, i.e., the voltage range over which the three adjacent pixels were bistable for at least 5 minutes, was measured to be 1.780 to 1.810 volts, and the holding voltage used in measuring the switching characteristics of the three adjacent pixels was 1.785 volts.

The switching characteristics of the three adjacent pixels were measured by varying the rms-amplitude of a 500 Hz voltage signal applied to the three pixels and varying the duration until switching was accomplished. Simultaneously, with the cell arranged between crossed polarizers, the optical transmission states of the three adjacent pixels of the cell were observed through a microscope. If all three pixels switched from one state to another, complete switching was considered to have occurred. If only one or two pixels switched, partial switching was considered to have occurred. If no pixels switched, no switching was considered to have occurred.

In FIG. 7 the switching times have been plotted on a logarithmic scale against a normalized switching voltage $V_S/V_H$, where $V_H$ denotes the holding voltage. It should be noted that two parallel curves are given in each case. The top curve represents the minimum time required to switch from one state to the other. The lower curve represents the pulse duration below which no switching occurs. The area between the curves represents partial or incomplete switching. This is also the case for the curves shown in FIGS. 8 and 9.

In FIG. 7, for $V_S/V_H$ greater than 1.0, WRITE transitions occur. In this region the switching time shows a rapid decrease as the switching voltage is increased. The switching time at $V_S = 2 V_H$ is about 52 msec and at $V_S = 3 V_H$ is about 20 msec. For $V_S/V_H$ less than 1.0, CLEAR transitions occur. These are considerably slower than the WRITE transitions. The switching time at zero volts, the shortest switching time, is about 200 msec.

The matrix addressing scheme of the present invention, which nonselectively CLEARS one or more rows (or one or more columns) of pixels substantially simultaneously and then selectively WRITES pixels one row or column at a time, is to be distinguished from those addressing schemes which selectively CLEAR selected pixels within a row one row at a time and then selectively WRITE pixels. The application of the former addressing scheme, rather than the latter, to the optical display of the present invention, results in relatively fast operation of the inventive optical display. Because the switching time for CLEAR transitions with the inventive optical display is relatively slow, it follows that the former addressing scheme, the one used with the present invention, permits the information content of the display to be changed much more quickly than if the latter addressing scheme were used.

EXAMPLE 3

Because the addressing scheme applied to the inventive optical display nonselectively CLEARS one or more rows (or one or more columns) of pixels substantially simultaneously rather than selectively CLEARING selected pixels one row at a time, the inventive optical display operates relatively quickly not only at room temperature, but also at relatively low temperatures. This can be inferred from FIG. 8.

Figure 8:
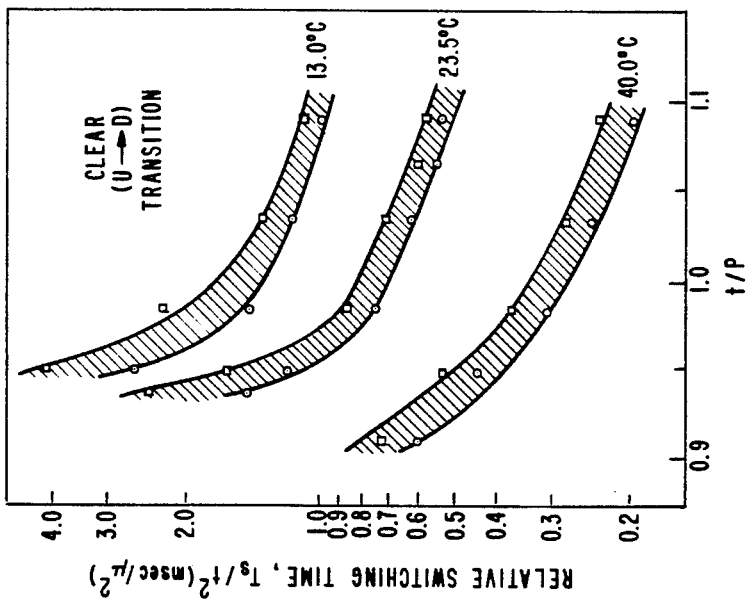
FIG. 8 is a graph of the CLEAR (U→D) relative switching times versus the thickness-to-pitch ratio of the bistable liquid crystal twist cell useful in the inventive optical display at zero switching voltage and at ambient temperatures of 40 degrees C., 23.5 degrees C., and 13 degrees C.

FIG. 8 depicts the typical dependence of switching time as a function of t/P for CLEAR transitions (at zero volts) of the liquid crystal twist cell useful in the present invention. Because switching times scale as the inverse of the square of the cell thickness ($1/t^2$), this figure depicts the dependence of relative switching time, $T_S/t^2$, on t/P. In particular, this figure depicts the influence of temperature on CLEAR switching times.

The data plotted in FIG. 8 represent the switching characteristics of the three adjacent pixels of the liquid crystal twist cell described in Example 2. The switching characteristics of the three pixels were measured at different concentrations of CN in E-7, to produce different t/P ratios, and for temperatures of 40.0° C., 23.5° C., and 13.0° C., using the procedure described in Example 2. The measurements at the three different temperatures were made with the cell in a thermostated enclosure.

As is evident from FIG. 8, switching times for CLEAR transitions exhibit a sharp increase as the temperature decreases from 40.0° C. to 23.5° C. to 13.0° C. These switching times increase by a factor of about 2.5 for each 10° C. decrease in temperature. Consequently, any addressing scheme applied to the present invention which CLEARS selected pixels within a row one row at a time will result in relatively slow operation at low temperatures. Because the addressing scheme applied to the present invention nonselectively CLEARS one or more rows of pixels simultaneously, it follows that the present invention is able to operate at relatively high speed even at low temperatures.

For purposes of contrast two-to-one addressing, an addressing scheme which selectively CLEARS pixels and then selectively WRITES pixels, is described below. The use of this addressing scheme in the context of the inventive optical display not only results in relatively slow operation of the display, but also produces adverse effects not associated with other displays.

Two-to-one addressing is depicted in FIG. 4(b). In two-to-one addressing, one or more selected column electrodes are subjected to a voltage pulse of amplitude $V_H + \delta V$ and of duration equal to the switching time while all other column electrodes are maintained at the holding voltage, $V_H$. Simultaneously, the selected row electrode is subjected to a voltage pulse of amplitude $-\delta V$ of duration equal to the switching time while all other row electrodes are maintained at zero voltage. Consequently, the selected pixels are subjected to a voltage pulse of amplitude $V_H + 2\delta V$ of duration equal to the switching time while the nonselected pixels in the selected row and selected columns are subjected to a voltage pulse of amplitude $V_H + \delta V$ of equal duration. The remaining nonselected pixels are held at the holding voltage. Two-to-one addressing permits selective CLEARING and WRITING of pixels since $\delta V$ can be either positive or negative. However, two-to-one addressing subjects the nonselected pixels in the selected row and columns to a voltage different from the holding voltage, i.e., to $V_H + \delta V$. Subjecting nonselected pixels to a voltage different from the holding voltage is referred to as "cross-talk."

FIG. 7, previously discussed in Example 2, depicts the phenomenon of cross-talk. That is, FIG. 7 includes switching data for the three adjacent pixels of the liquid crystal twist cell described in Example 2, which data depicts what the cross-talk effects of two-to-one addressing would be, if two-to-one addressing were to be used in the present invention. In generating the data it was assumed that two-to-one addressing would be implemented by setting $\delta V = -V_H/2$ (in FIG. 4(b)) to CLEAR selected pixels with a zero voltage pulse, and by setting $\delta V = +V_H/2$ to WRITE selected pixels with a voltage pulse $2V_H$.

As shown in FIG. 7, when a selected pixel, denoted A, is subjected to a zero voltage pulse of duration equal to about 200 msec in order to produce a CLEAR transition with two-to-one addressing, the nonselected pixels in the selected row and columns, denoted B, are subjected to a voltage pulse of equal duration and of amplitude 0.5 $V_H$. Similarly, if a selected pixel, denoted D, is subjected to a voltage pulse of amplitude 2 $V_H$ and a duration equal to about 68 msec in order to produce a WRITE transition with two-to-one addressing, the nonselected pixels in the selected row and columns are subjected to a voltage pulse of amplitude 1.5 $V_H$ of equal duration. As is evident from FIG. 7, the CLEAR transition curve is relatively shallow near the origin and both points A and B are close to this curve. If the nonselected pixels B are to avoid undergoing a CLEAR transition, the duration of the voltage pulses used to produce CLEAR transitions must be very precise. Consequently, the performance of the electronics used to generate two-to-one addressing with the inventive optical display would have to be very precise, and therefore the electronics would have to be relatively complex. In addition, and perhaps more importantly, the widths of the CLEAR and WRITE switching bands shown in FIG. 7 increase as cell thickness variations increase. Consequently, for a liquid crystal twist cell which does not have great thickness uniformity the point B, for example, is likely to fall within the CLEAR switching band and thus nonselected pixels will undergo at least partial switching. To avoid this occurrence, cells addressed with two-to-one addressing would have to be fabricated with relatively great thickness uniformity, which is difficult to do. Because there is no cross-talk phenomenon with the inventive display, the performance of the electronics used in the invention need not be very precise, and the electronics is simplified. In addition, the cells included in the inventive display need not have great thickness uniformity, making fabrication of the cells easier.

Two-to-one addressing also subjects nonselected pixels to cumulative cross-talk effects, i.e., nonselected pixels are subjected to successive voltage pulses of amplitude different from the holding voltage during the CLEARING and WRITING of different selected pixels. This results in random, nonintended switching of pixels. One procedure for overcoming these cumulative cross-talk effects is to wait for them to subside. Since there are no such cumulative effects with, for example, the preferred embodiment of the inventive display, there is no need to wait for such effects to subside with the preferred embodiment and thus the preferred embodiment has a relatively high operating speed.

The phenomenon of cross-talk, associated with the use of two-to-one addressing, also has the adverse effect of imposing yet further restrictions on the permissible variation in t/P of the inventive optical display, making fabrication of the display yet more difficult. This can be inferred from FIG. 9 which depicts one of the effects of cross-talk on permissible variations in t/P.

Figure 9:
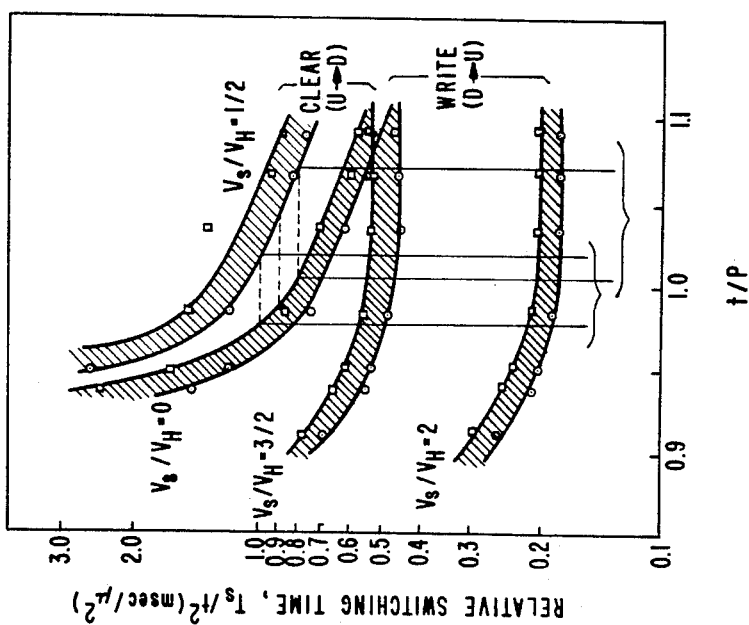
FIG. 9 is a graph of the CLEAR (U→D) and WRITE (D→U) relative switching times versus the thickness-to-pitch ratio of the bistable liquid crystal twist cell useful in the inventive optical display for different values of the ratio of switching voltage to holding voltage.

FIG. 9 depicts the typical dependence of relative switching times, $T_S/t^2$, on t/P for WRITE transitions and CLEAR transitions of the liquid crystal twist cell useful in the present invention. The data displayed in FIG. 9 were obtained by measuring the switching characteristics of the three adjacent pixels of the liquid crystal twist cell described in Example 2, at room temperature (23.5° C.), for different concentrations of CN in E-7 (and thus different t/P ratios) and for different switching voltages. FIG. 9 depicts the dependence of $T_S/t^2$ on t/P for WRITE switching voltages $V_S = 2 V_H$ and $3/2 V_H$, and CLEAR switching voltages $V_S = 0$ and $\frac{1}{2} V_H$. When two-to-one matrix addressing is used, a switching voltage $V_S = 2 V_H$ ($\delta V = +V_H/2$ in FIG. 4(b)) is applied to a selected pixel in order to produce a WRITE transition, and cross-talk effects result in nonselected pixels in the selected row and column being subjected to a switching or cross-talk voltage $V_S = 3/2 V_H$. Similarly, when a zero switching voltage ($\delta V = -V_H/2$ in FIG. 4(b)) is applied to a selected pixel to produce a CLEAR transition, cross-talk effects result in nonselected pixels in the selected row and column being subjected to a switching or cross-talk voltage $V_S = V_H/2$. In order to use two-to-one addressing, the WRITE switching time must be chosen so as to fall above the $V_S/V_H = 2$ curve but below the $V_S/V_H = 3/2$ curve (to prevent nonselected pixels from switching). Similarly, the CLEAR switching time must be chosen so as to fall above the $V_S/V_H = 0$ curve but below the $V_S/V_H = \frac{1}{2}$ curve. While a WRITE switching time can be chosen without imposing any new limitations on variation in t/P, any choice of the CLEAR switching time which falls above the $V_S/V_H = 0$ curve but below the $V_S/V_H = \frac{1}{2}$ curve further limits allowable variation in t/P, as is evident from FIG. 9. That is, cross-talk effects inherent in the use of two-to-one matrix addressing further limit allowable variation in t/P to a smaller range, for example, than the previously mentioned preferred range of 0.95 to 1.10 for E-7 doped with CN. Because there are no cross-talk effects in, for example, the preferred embodiment, as well as other embodiments, of the inventive optical display, it follows that the need for great precision in the thickness uniformity of the liquid crystal twist cell useful in the present invention is relaxed, resulting in easier fabrication of the inventive optical display.

Three-to-one addressing does not exhibit the phenomenon of cross-talk, but two-to-one dose. Therefore, it follows that the application of the former addressing scheme, rather than the latter scheme, to the invention optical display reduces the likelihood that nonselected pixels will undergo a switching transition, for the reasons discussed above. Consequently, information is more reliably displayed when three-to-one addressing is applied to the inventive optical display than when two-to-one addressing is used.

What is claimed is:

1. A liquid crystal optical display, comprising:
    a cholesteric liquid crystal;
    two bounding surfaces which confine the liquid crystal, at least one of which bounding surfaces transmits electromagnetic radiation;
    voltage means for applying voltage differences across one or more of a plurality of discrete portions of the liquid crystal, which discrete portions are arranged in a matrix of rows and columns; and
    means for optically discriminating between two different orientations of the liquid crystal, characterized in that
    said liquid crystal assumes a helical configuration in an unstrained state, the liquid crystal at at least one of the bounding surfaces is obliquely inclined with respect to said bounding surface, and the liquid crystal has at least two stable states when in the presence of the single holding voltage, which stable states are capable of being switched from one to the other without passing a disclination through the liquid crystal, and
    said voltage means substantially simultaneously switches all said discrete portions of at least one row or column of said matrix from a first stable state to a second stable state by applying to all said discrete portions in said row or column a voltage below said holding voltage for a first preselected length of time, and then selectively switches discrete portions of said matrix from said second stable state to said first stable state by applying to selected discrete portions a voltage above said holding voltage for a second preselected length of time, thereby causing information to be displayed.

2. The display of claim 1 wherein said voltage means switches a selected discrete portion of said liquid crystal from said second stable state to said first stable state by applying to said selected discrete portion, for said second preselected length of time, a voltage substantially equal to three times the holding voltage while nonselected discrete portions are subjected to a voltage substantially equal to the holding voltage.

3. The display of claim 1 wherein said holding voltage takes on any value within a range of voltages determined by the properties of the liquid crystal optical display, said range described by $V_H \pm \Delta V$, $V_H$ being a mean voltage value of said range and $\Delta V$ being a voltage increment above and below $V_H$ describing the limits of said range.

4. The display of claim 3 wherein said voltage means includes a plurality of electrodes arranged on each of said bounding surfaces, the electrodes on one bounding surface being arranged transversely with respect to the electrodes on the other bounding surface, the projections of the electrodes on one bounding surface onto the electrodes of the other bounding surface defining said matrix of discrete portions of said liquid crystal, and the electrodes on each of said bounding surfaces constituting, respectively, row and column electrodes which correspond to the rows and columns of said matrix.

5. The display of claim 4 wherein said voltage means switches selected discrete portions from said second stable state to said first stable state by applying, in sequence, a voltage $-(1+\Delta z)V_H$ to each row electrode while all other row electrodes receive a voltage $(1+\Delta y)V_H$, and substantially simultaneously applying a voltage $(2+\Delta x)V_H$ to each column electrode which defines a selected discrete portion with the row electrode receiving the voltage $-(1+\Delta z)V_H$ and zero voltage to all other column electrodes, said voltages being supplied for said second preselected length of time, and $\Delta x$, $\Delta y$, and $\Delta z$ taking on the values $|\Delta y| \leq \Delta v/V_H$,
$|\Delta x - \Delta y| \leq \Delta V/V_H$, and the magnitude of $\Delta z$ is such that any discrete portion remains stable when subjected to a voltage $V_H(1+\Delta z)$ applied for said second preselected length of time.

6. Apparatus in accordance with claim 5 wherein $|\Delta z| \leq \Delta V/V_H$.

7. The display of claim 4 wherein said voltage means switches selected discrete portions from said second stable state to said first stable state by applying, in sequence, a voltage $(2+\Delta x)V_H$ to each column electrode while all other column electrodes receive zero voltage, and substantially simultaneously applying a voltage $-(1+\Delta z)V_H$ to the row electrodes defining a selected discrete portion with the column electrode receiving the voltage $(2+\Delta x)V_H$ and a voltage $(1+\Delta y)V_H$ to all other row electrodes, said voltages being applied for said second preselected length of time, and $\Delta x$, $\Delta y$, $\Delta z$ taking on the values $|\Delta y| \leq \Delta V/V_H$,
$|\Delta z| \leq \Delta V/V_H$, and the magnitude of $\Delta x$ is such that any discrete portion remains stable when subjected to a voltage $V_H(1+\Delta x - \Delta y)$ applied for said second preselected length of time.

8. The display of claim 7 wherein $|\Delta x - \Delta y| \leq \Delta V/V_H$.

9. A method for displaying information, comprising the step of changing the spatial orientations of discrete portions of the cholesteric liquid crystal of a liquid crystal optical display which includes bounding surfaces which confine the cholesteric liquid crystal, at least one of which bounding surfaces transmits electromagnetic radiation, and which includes means for optically discriminating between at least two different orientations of the liquid crystal, and wherein the discrete portions of the liquid crystal are arranged in a matrix of rows and columns, characterized in that said liquid crystal assumes a helical configuration in an unstrained state, the liquid crystal at at least one of the bounding surfaces is inclined obliquely with respect to the bounding surface, and the liquid crystal has at least two stable states when in the presence of a single, nonzero holding voltage, which stable states may be switched from one to the other without passing a disclination through the liquid crystal, and said changing step includes the steps of nonselectively and substantially simultaneously switching all the discrete portions of at least one row or one column of said matrix from a first stable state to a second stable state by applying to all said discrete portions in said row or column a voltage below said holding voltage for a first preselected length of time, and then selectively switching discrete portions of said matrix from said second stable state to said first stable state by applying to selected discrete portions a voltage above said holding voltage for a second preselected length of time.

10. The method of claim 9 wherein said selective switching step includes the step of applying a voltage substantially equal to three times the holding voltage to the selected discrete portions for said second preselected length of time while applying a voltage substantially equal to the holding voltage to nonselected discrete portions.

11. The method of claim 9 wherein said holding voltage takes on any value within a range of voltages determined by the properties of the liquid crystal optical display, said range described by $V_H \pm \Delta V$, $V_H$ being a mean voltage value of said range and $\Delta V$ being a voltage increment above and below $V_H$ describing the limits of said range.

12. The method of claim 11 wherein said selective switching step includes the steps of:

sequentially applying a voltage $-(1+66z)V_H$ to each row of discrete portions of said matrix while applying a voltage $(1+\Delta y)V_H$ to all other rows of discrete portions of said matrix; and substantially simultaneously applying a voltage $(2+\Delta x)V_H$ to each column of discrete portions which contains a selected discrete portion lying within said row of discrete portions receiving the voltage $-(1+\Delta z)V_H$ and zero voltage to all other columns of discrete portions, said voltages being applied for said second preselected length of time, and $\Delta x$, $\Delta y$ and $\Delta z$ take on the values $|\Delta y| \leq \Delta V/V_H$,
$|\Delta x - \Delta y| \leq \Delta V/V_H$, and the magnitude of $\Delta z$ is such that any discrete portion remains stable when subjected to a voltage $V_H(1+\Delta z)$ applied for said second preselected length of time.

13. The method of claim 12 wherein $|\Delta z| \leq \Delta V/V_H$.

14. The method of claim 11 wherein said selective switching step includes the steps of:

sequentially applying a voltage $(2+\Delta x)V_H$ to each column of discrete portions of said matrix while all other columns of discrete portions receive zero voltage; and substantially simultaneously applying a voltage $-(1+\Delta z)V_H$ to the rows of discrete portions which contain selected discrete portions lying within said column of discrete portions receiving the voltage $(2+\Delta x)V_H$ and a voltage $(1+\Delta y)V_H$ to all other rows of discrete portions, said voltages being applied for said second preselected length of time, and $\Delta x$, $\Delta y$, $\Delta z$ taking on the values $|\Delta y| \leq \Delta V/V_H$,
$|\Delta z| \leq \Delta V/V_H$, and the magnitude of $\Delta x$ is such that any discrete portion remains stable when subjected to a voltage $V_H(1+\Delta x - \Delta y)$ applied for said second preselected length of time.

15. The method of claim 14 wherein $|\Delta x - \Delta y| \leq \Delta V/V_H$.

* * * * *

UNITED STATES PATENT AND TRADEMARK OFFICE
CERTIFICATE OF CORRECTION

PATENT NO. : 4,529,271

DATED : July 16, 1985

INVENTOR(S) : Dwight W. Berreman, William R. Heffner, and Allan R. Kmetz

It is certified that error appears in the above-identified patent and that said Letters Patent is hereby corrected as shown below:

In the Abstract, line 5, "3:1 matrix" should read --matrix--. Column 9, line 63, "exits" should read --exists--. Column 14, line 1, "ΔzΔ" should read --Δz--; line 26, "5/8" should read --1/8--. Column 22, line 19, "66z" should read --Δz--.

Signed and Sealed this

Twenty-first Day of October, 1986

[SEAL]

Attest:

DONALD J. QUIGG

Attesting Officer     Commissioner of Patents and Trademarks